Dec. 4, 1956  E. R. BERGMANN  2,772,770
SHAKER CONVEYORS
Filed July 11, 1952  4 Sheets-Sheet 1
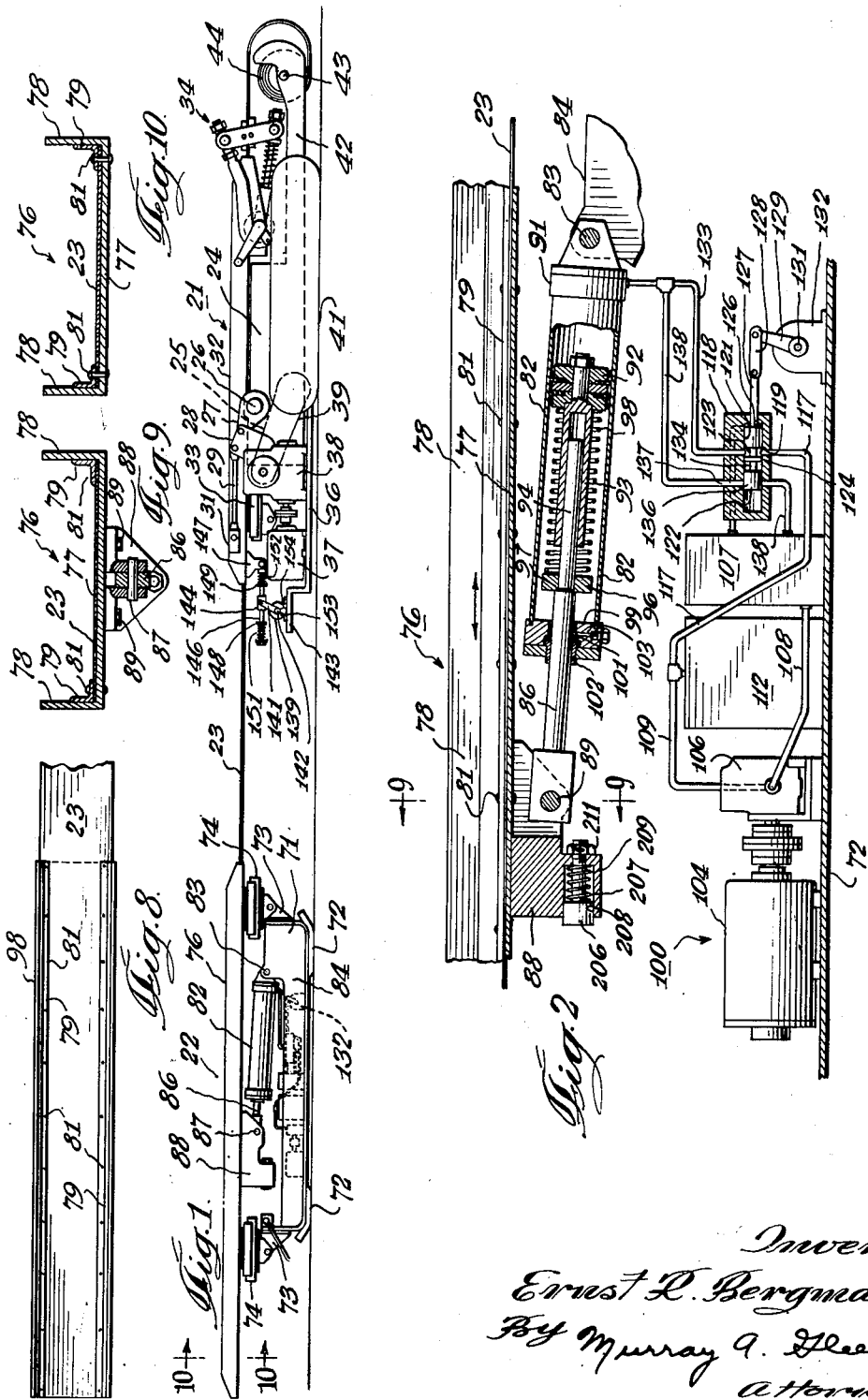
Inventor
Ernst R. Bergmann
By Murray Q. Gleeson
Attorney Dec. 4, 1956     E. R. BERGMANN     2,772,770
SHAKER CONVEYORS
Filed July 11, 1952                               4 Sheets-Sheet 2
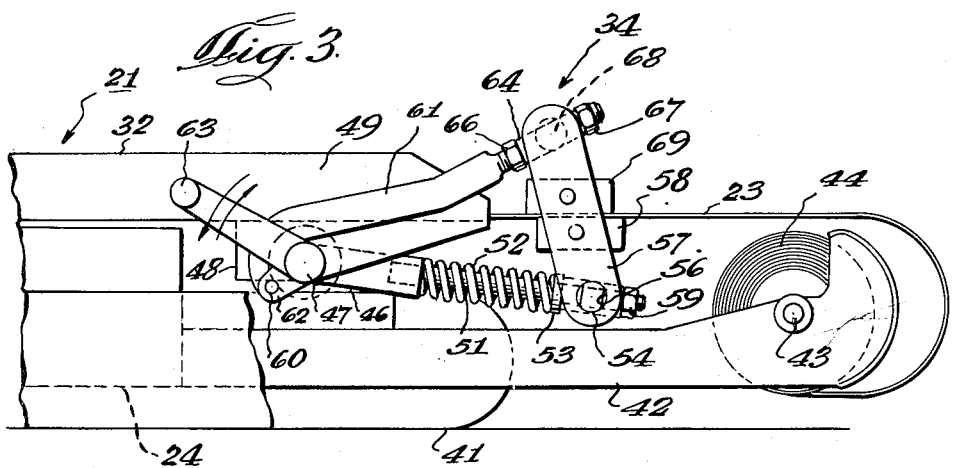
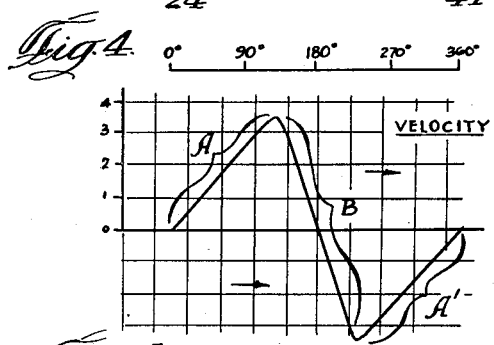
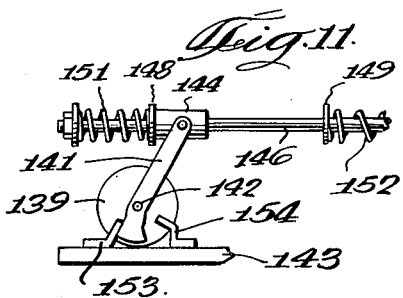
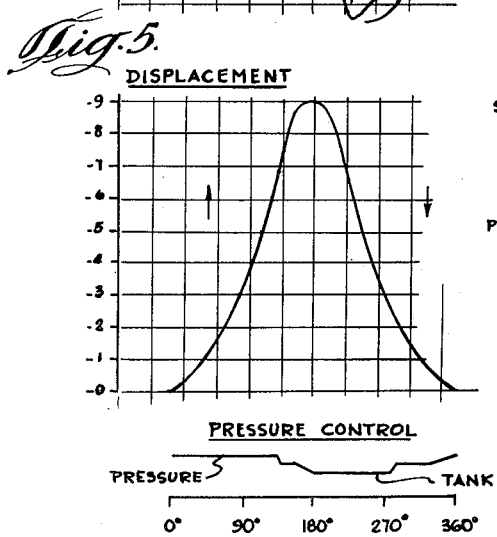
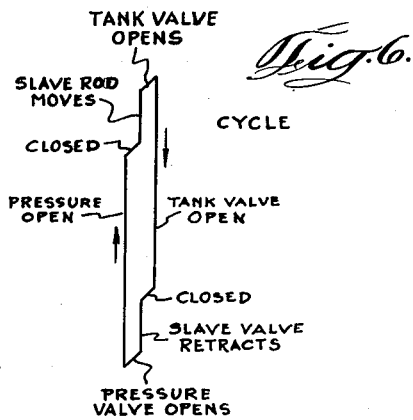
Inventor
Ernst R. Bergmann
By Murray G. Gleeson
Attorney

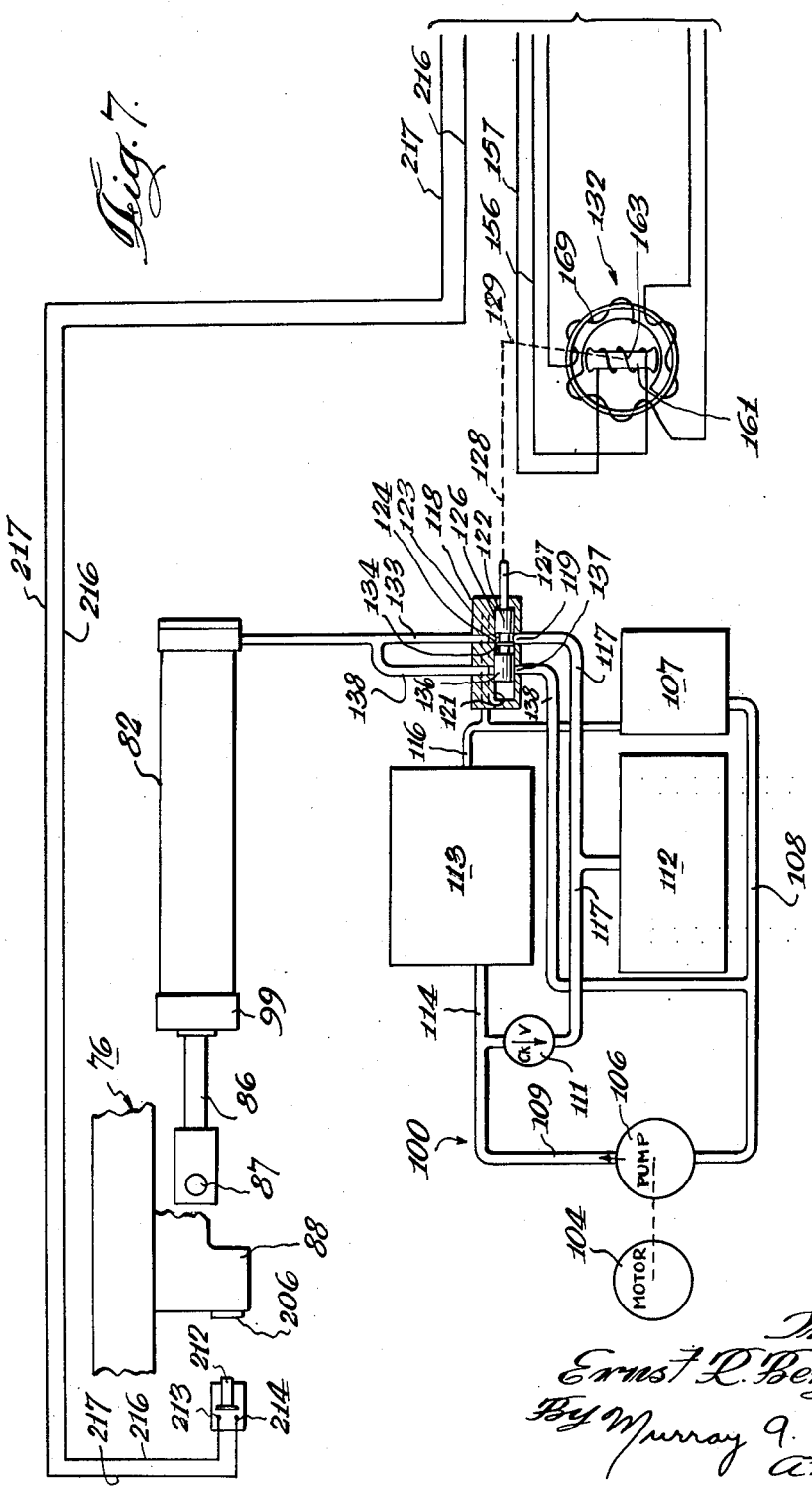

Dec. 4, 1956 E. R. BERGMANN 2,772,770
SHAKER CONVEYORS
Filed July 11, 1952 4 Sheets-Sheet 4
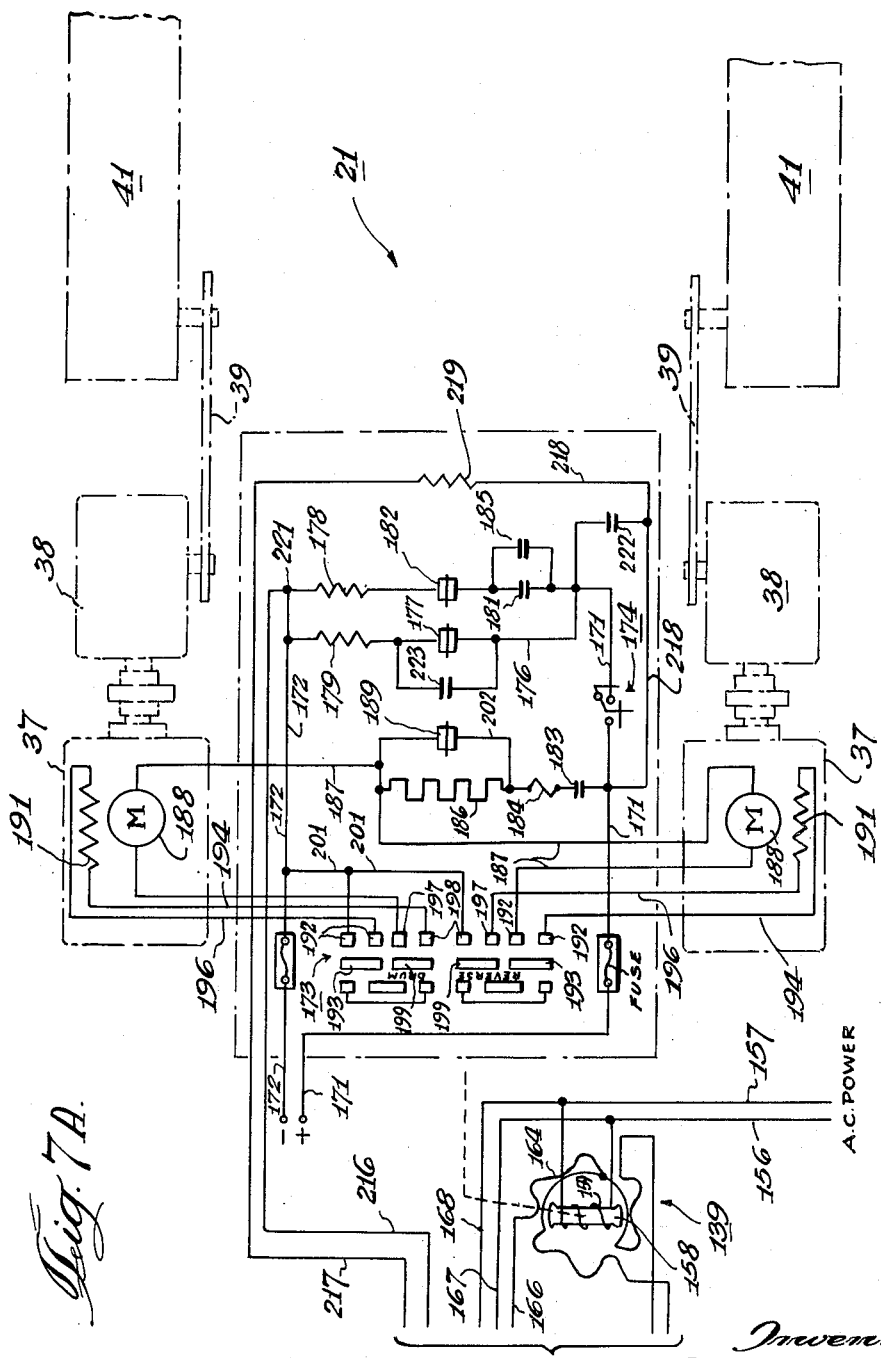
Fig. 7A.
Inventor
Ernst R. Bergmann
By Murray A. Gleeson
Attorney

United States Patent Office 2,772,770
Patented Dec. 4, 1956

2,772,770

SHAKER CONVEYORS

Ernst R. Bergmann, Evergreen Park, Ill., assignor to Goodman Manufacturing Company, Chicago, Ill., a corporation of Illinois Application July 11, 1952, Serial No. 298,263

15 Claims. (Cl. 198—220)

This invention relates generally to improvements in shaker conveyors, and more particularly to a shaker conveyor of the type employing a reciprocating flexible steel belt instead of the usual connected trough pans.

Heretofore shaker conveyors for transporting material, such as in a coal mine or the like, have employed trough pan lines which are composed of troughing sections capable of being bolted together. Reciprocating motion is given to the pan line by a shaker drive, which gives the pan line a reciprocating motion whereby material is transported therealong from the inby end to the outby end where the material is discharged generally upon a moving belt conveyor or other shaker conveyors. The trough pans are mounted upon frames held in position by jacks bearing against the mine roof, ball frames being interposed between the pan line and the mounting frame so that the pan line can have reciprocating movement. As the working face is advanced additional trough pans must be added to the pan line, so that gathering and loading equipment or a continuous miner at the working face can discharge its contents directly onto the shaker pan line.

The addition of such trough pan sections to the pan line has required brief shutdowns, and in order to avoid such shutdowns it has been proposed that a flexible steel belt supported upon troughing rollers be substituted for the trough pan sections. However, such belt troughing is able to withstand tensile stresses only, and when the shaker drive pushes on the belt in one direction of its motion, the belt will collapse or buckle.

Heretofore, in order to place the belting under tension at all times the outby end thereof has been connected to suitable spring means to impose such tension. Such tensioning arrangements, however, have imposed an inordinate load upon the shaker drive, since it must not only transport the material but must also work against the force of such springs.

In carrying out the present invention, an inby shaker drive is mounted upon a mobile inby unit having crawler treads. The inby unit supports the belt for reciprocating movement and a reel of additional belting, so that as the working face is advanced the inby mobile unit may move upon its crawler treads toward the working face and pay out an additional length of belt. The belt is connected to an outby unit which is arranged to place tension on the belt only during the carrying portion of the stroke thereof, such tension being removed during the back stroke of the belt when the shaker drive is pulling upon the belt, and when the belt moves relative to the material being conveyed thereon. The inby mobile unit is arranged with a gripping mechanism which moves with a frame supporting the belt and reciprocating under the influence of the shaker drive. The mobile inby unit is also arranged so as to transmit a signal therefrom to the outby unit so that the outby unit will place a tension upon the belt during movement of the belt in the outby direction.

The invention is further characterized by means located on the outby unit which is sensitive to the increased displacement of the tensioning means as would be occasioned by a change in load on the belt or by a change in position for some unintended reason of either the outby unit or the inby unit or both. In carrying out the invention the outby unit is also arranged to transmit a signal back to the inby unit whereby the position of same may be corrected by causing the motors turning the crawler treads to operate at low speed.

With the foregoing considerations in mind it is a principal object of this invention to afford an improved shaker conveyor which employs a flexible steel belt for the troughing pan, and to afford mechanism whereby the troughing belt need be subjected to tension to stiffen same only during the portion of the cycle of reciprocating movement thereof when the belt is transporting material.

Another object is to afford a construction for a shaker driven flexible trough whereby the flexible trough is tensioned properly by tensioning means operable when the flexible trough is moving in a direction as would tend to cause collapse of same.

Another object is to afford a construction for a shaker conveyor of the type employing a reciprocating steel belt wherein a suitable signal will be transmitted from one unit thereof to another unit thereof to indicate a need for the change in positioning of the said one unit so as to maintain the correct tension upon the belt at all times.

Other objects and important features of the invention will be apparent from a study of the following specification taken with the drawings which together show a preferred embodiment of the invention, and what is now considered to be the best mode of practicing the principles thereof. Other embodiments of the invention will be suggested to those having the benefit of the teachings herein and it is therefore intended that the invention not be limited by the precise embodiment shown and described, nor otherwise than by the scope and purview of the claims subjoined.

In the drawings:

Fig. 1 is a front elevation view of a shaker conveyor having embodied therein the improvements according to the present invention;

Fig. 2 is an enlarged front elevation view of a portion of the outby end of the conveyor shown in Fig. 1, showing details of a fluid pressure operated cylinder and a fluid pressure system therefore for placing tension upon the troughing belt of such shaker conveyor;

Fig. 3 is an enlarged detailed front elevation view of the gripping mechanism mounted on the inby end of the shaker conveyor shown in Fig. 1;

Fig. 4 is a velocity-time curve showing the velocity of the troughing belt during various portions of its cycle;

Fig. 5 is a displacement-time curve to the same abscissae scale as Fig. 4, and showing the relationship thereof to the control of pressure to the operating cylinder shown in Fig. 2;

Fig. 6 is a diagram showing the operating cycle obtaining in the application of pressure fluid to the actuating cylinder shown in Fig. 2, the scale of ordinates thereof corresponding to the scale shown in Fig. 5;

Fig. 7 is a somewhat schematic view of the outby end of the shaker conveyor shown in Fig. 1, and showing means for receiving a signal from the inby end of the conveyor, and also showing means for transmitting a signal from the outby conveyor unit to the inby conveyor unit;

Fig. 7A is a schematic view of part of the inby end of the conveyor unit shown in Fig. 1 showing means for transmitting a signal to the outby conveyor unit, and also showing a circuit for controlling the drive motors of the inby unit, said motors being also controlled in their operation by the reception of a signal from the outby conveyor unit;

Fig. 8 is a plan view of the outby unit, showing the manner in which the flexible steel belt is connected thereto;

Fig. 9 is a section taken along the line 9—9 of Fig. 2 looking in the direction of the arrows, and showing the manner of attachment of the piston rod of the actuating cylinder to the trough pan of the outby unit;

Fig. 10 is a section taken along the line 10—10 of Fig. 1 looking in the direction of the arrows; and Fig. 11 is an enlarged front elevation view of a transmitting selsyn motor shown in Fig. 1.

Referring now particularly to Fig. 1 of the drawings the improved shaker conveyor according to the present convention consists of a mobile inby unit referred to generally by the reference numeral 21 and an outby unit referred to generally by the reference numeral 22. The mobile inby unit 21 affords a means of support for a flexible steel conveyor belt 23 which is also supported on the outby conveyor unit 22, the inby unit 21 being adapted to give reciprocating movement to the belt 23 in a fashion so as to convey material therealong. The belt 23 is adapted to be supported between the inby unit 21 and the outby unit 22 by means of troughing frames, not shown, arranged to give a contour in cross section to the belt 23 in the form of a trough so that material may be conveyed longitudinally thereof without spilling.

The inby unit 21 consists of laterally spaced main side frames 24 which inclose a shaker drive 25 including a rock shaft 26 extending through the side frames 24. Rock arms 27 are fast to each end of the rock shaft 26 and each is connected to a link 28 which in turn is pivotally connected to drive rod 29 connected to a block 31 disposed on each side of a trough pan 32. The trough pan 32 is supported upon a ball frame 33 and extends toward the inby end of the unit 21 where it supports a gripping mechanism indicated generally by the reference numeral 34.

The rock arm 27 is adapted to rock to and fro with an angular velocity of such an order as to impart suitable linear velocity and acceleration to the troughing belt 23 which is gripped by the grip blocks 34. The precise details of the driving mechanism for the rock shaft 26 and the rock arm 27 are no part of this invention and so need not be described in detail. The characteristics of the motion, however, of the belt 23 are such that the belt 23 moves relatively slowly in the outby direction, but returns rapidly in the inby direction, so that material is conveyed therealong with a shaking motion, in a manner well understood by those skilled in the art.

The side frame members 24 have a stage 36 extending in an outby direction therefrom to support a pair of drive motors 37 which through speed reducers 38 and driving chains 39 impart crawling movement to a pair of crawler treads 41 mounted on each side of the side frame members 24.

The side frame members 24 also have arms 42 extending toward the inby end or working face which provide spaced supports for an axle 43 which in turn supports a reeled supply 44 of the conveyor belt 23.

The grip blocks 34 are adapted to be released, so that the mobile inby unit 21 may be advanced in an inby direction, and so that an additional length of conveyor belt may be connected between the mobile inby unit 21 and the outby unit 22. Referring now to Fig. 3 of the drawings, the grip blocks 34 consists of a lower grip block arm 46 which is pivotally connected to a pin 47 extending outwardly from a plate 48 extending downward from a side wall 49 of the trough 32. The arm 46 is drilled at the free end thereof to receive a rod 51 encircled by a spring 52 which urges a trunnion block 53 having stub trunnion shafts 54 extending therefrom, and which extend through an opening 56 in the lower end of a grip link arm 57 having a grip block 58 located substantially centrally thereof and in contact with the lower side of the belt 23. A nut 59 is threaded to the end of the rod 51 to hold a trunnion block 53 upon the rod 51.

An upper grip block arm 61 is rocked by a bell crank 62 having an operating handle 63 and a pinned connection at 60 to the grip block arm 61 into position against the pin 47, and has a trunnion block 64 at the free end thereof held in position by nuts 66 and 67 threaded to the arm 61. The trunnion block 64 has a pair of trunnion stub shafts 68 which are pivotally connected to the upper end of the grip link arm 57. An upper grip block 69 is pivoted to the link grip arm 57 substantially centrally thereof, and is in contact with the upper surface of the belt 23. The line of centers including the pinned connection 60 to the bell crank 62 and the center of the stub shafts 68 passing through the upper grip link 61 lie on a line beyond the center of the pin 47, so that when the operating handle 63 is rocked in a counterclockwise direction the grip link arm 57 will occupy the position shown with the grip blocks 58 and 69 firmly engaging the edges of the belt 23 therebetween to clamp same during the reciprocating movement of the trough 32.

The grip blocks 34 are arranged to release the tension on the belt 23 when the tension thereon increases beyond a desired amount. The tension in the belt 23 tends to rock the grip link arm 57 in a clockwise direction, as viewed in Fig. 3, about the trunnion stub shafts 68 of the upper grip block arm 61. The rocking motion of the grip link arm 57 is opposed by the spring 52 of the lower grip link arm 46. When the tension in the belt 23 is of a value sufficient to overcome the spring 52 and the grip arm 57 is rocked in the manner described, the clamping engagement of the grip blocks 69 and 58 will be released sufficiently to afford release of the tension of the belt 23, after which release the force of the spring 52 will cause the grip blocks 69 and 58 once more to grip the belt 23 while reciprocating with the trough pan 32.

The outby conveyor unit 22 consists of a frame indicated generally by the reference numeral 71 which is mounted on a pair of skids 72 which provide spaced points for mine jacks, not shown, adapted to bear against the mine roof to hold the outby unit 22 in place. The frame 71 is provided with extending ears 73 which provide points of support for ball frames 74 which underlie an outby trough section 76. The outby trough section 76 includes a bottom plate 77 flanked by side walls 78 integral therewith. The conveyor belt 23 is held in position to the bottom plate 77 by means of angles 79, 79 each having a vertical leg bearing against the side walls 78 and each having a horizontal leg with rivets 81 passing therethrough and through the belt 23 and the bottom plate 77. The trough section 76 is moved with the belt 23 in a load carrying direction by means of a fluid actuated cylinder 82 which has a hinged connection at 83 to a pair of vertical reinforcing ribs 84 for the frame 71.

Referring now to Fig. 2, the fluid actuated cylinder 82 includes a piston rod 86 which has a pinned connection at 87 to a bracket 88 held by cap screws 89 to the underside of the bottom plate 77, see also Fig. 9. The fluid operated cylinder 82 is closed at the fluid admission end thereof by a cylinder head 91, and has a piston 92 therein with a skirt 93 of a reduced outside diameter and adapted to be supported upon a reduced diameter portion 94 of the piston rod 86, said portion 94 having a sliding fit with the inner diameter of the skirt 93. A collar 96 is arranged to bear against a shoulder 97 formed at the juncture of the piston rod 86 with the portion 94 thereof, and a spring 98 is adapted to bear against the collar 96 at one end thereof and against the piston 92 at the other end thereof, the coiled spring 98 encircling the skirt 93.

The skirt 93 is spaced a distance from the collar 96, and the reduced diameter of piston rod 94 is likewise spaced an equal distance from the piston 92, so that the piston 92 may move at times relative to the piston rod 86, under conditions as will appear as this specification proceeds.

The piston rod end of the cylinder 82 is closed by a head 99 which affords a support for an oil seal 101 encircling the piston rod 86 and a support for a bushing 102 providing a guide for the piston rod 86. A small breather passageway 103 is provided in the head member 99 and enables oil or air to be displaced from within the cylinder 82 upon movement of the piston 92.

The cylinder 82 and the piston rod 86 are adapted to be actuated so as to place tension upon the belt 23 when the shaker drive 25 of the mobile unit 21 moves the belt 23 in a direction tending to buckle same. Fluid under pressure for actuating the cylinder 82 and the piston rod 86 is supplied by a fluid pressure system indicated generally by the reference numeral 100. Said fluid pressure system consists of a motor 104 which drives a pump 106, see also Fig. 7, supplied with fluid from a tank 107 by an intake line 108. The pumped fluid leaves the pump 106 by a pressure line 109 to be delivered past a check valve 111 to an accumulator 112 where the fluid is stored under pressure. An unloading valve 113 is connected by a line 114 branching from the pressure line 109 and is operable to discharge the pumped fluid by a line 116 to the tank 107 when the pressure in the accumulator 112 reaches a value in excess of a predetermined amount.

A pressure line 117 is connected from the accumulator 112 to a control valve 118 at a port 119 opening onto a bore 121 in the valve body 118. A spool valve member 122 is slidable within the bore 121 and has a reduced diameter portion 123 located between spaced lands 124 and 126 on the spool valve member 122. The spool valve member 122 is actuated by a push rod 127 connected to a link 128 which in turn is connected to a rock arm 129 mounted on the motor shaft 131 of a selsyn motor 132.

When the valve 118 is in a position shown in Fig. 2 fluid will move from the pressure line 117 past the reduced diameter portion 123 to supply the cylinder 82 by means of a pressure line 133, to move the piston 92 and the piston rod 86 to the left.

The spool valve number 122 has a reduced diameter portion 134 defined by the land 124 and an end land 136. The selsyn motor 132 is adapted to rock the rock arm 129 in a counterclockwise direction as seen in Fig. 2, under conditions as will appear, to move the reduced diameter portion 134 into register with a port 137 connecting a line 138 to tank, so as to release the pressure from behind the piston 92, and so that the conveyor belt 23 may move to the right on a return stroke of the conveyor unimpeded by any residual pressure within the cylinder 82.

Referring now particularly to Fig. 1 of the drawings the mobile unit 21 is provided with means for signaling the selsyn motor 132 of the stationary unit 22, see also Figs. 2, 7 and 7A, of the necessity of placing tension on the belt 23 by the clinder 82. Such a signaling means consists of a selsyn generator 139 having a rock arm 141 connected rigidly to a motor shaft 142 thereof, see also Fig. 9. The selsyn generator 139 is mounted on a bracket 143 extending from the stage 36 supporting the drive motors 37. The rock arm 141 has pin connected thereto a block 144 which slides upon a rod 146 rigidly connected to a bracket 147 extending below the trough frame 32. The rod 146 is provided with movable stops 148 and 149 which are opposed in their movement by springs 151 and 152 respectively. The rocking movement in one direction of the rock arm 141 is limited by a stop 153 and in the other direction by a similar stop 154. It will be seen that the reciprocating movement of the belt 23 will rock the arm 141 first in one direction and then in the other alternately against the stops 153 and 154.

Referring now to Fig. 7 and 7A of the drawings, the selsyn 132 and 139 are supplied with power from an A. C. source by means of power leads 156 and 157. Generator 139 has a rotor 158 with a winding 159 which is excited from the A. C. source. Motor 132 similarly has a rotor 161 which is excited by a winding 163 from the same A. C. source, the two windings being connected in parallel. Selsyn generator 139 has a Y-connected stator winding 164 with leads 166, 167 and 168 which are connected in parallel with a Y-connected stator winding 169 of the selsyn motor 132. It will be apparent that when the rotor 158 of selsyn 139 is rotated through any angle the rotor 161 of the motor 132 will be rotated through the same angle. The theory underlying selsyn motors and generators of the type just described is too well known to make same necessary in this description, and it will appear that the selsyn generator 139 will act as a transmitter of a condition of the belt 23 at the mobile inby unit 21, while the selsyn motor 132 will act as a receiver of the condition then obtaining at the selsyn generator 139.

It may be noted that the power for exciting the windings 159 and 163 may be derived from any suitable A. C. source or from a motor-generator set, not shown, made a part of the mobile unit 21.

Referring now particularly to Fig. 7A, the mobile unit 21 is supplied with power from a pair of leads 171 and 172. The supply of power to the motors 37 is under the control of a reversing drum indicated generally by the reference numeral 173 and a start-stop switch indicated generally by the reference numeral 174. When the switch 174 is moved to the start position shown a circuit will be made including a lead 176 branching from the lead 171 and including a normally closed contact 177 of a main relay having a coil 178 and a winding 179 of a time delay contactor. When the winding 179 is thus energized, a contact 181 thereof will close, which will complete a circuit from the lead 171 through a normally closed overload relay contact 182 and the main relay winding 178, the circuit being completed by way of the lead 172.

The energizing of the winding 178 closes a holding contact 185 connected in parallel with the contact 181 and also closes a contact 183 to complete a circuit through an overload relay winding 184 and a resistance 186 connected in series with a leads 187 to armatures 188 of the drive motors 37. It will be remembered that the energization of the winding 179 causes a contact 189 thereof to open, so that the armatures of the motors are in series with the resistance 186.

The motors 37 are series connected with fields 191, the circuits to the armatures 188 and the fields 191 including contacts 192 closed by contact bar 193 of the reverse drum 173, the lead 194 to the field winding 191, a lead 196, contacts 197 and 198 which are closed by a contact bar 199 of the reverse drum 173 and thence by a lead 201 to the other line 172.

The winding 179 of the time delay contactor is arranged to close the contact 189 after a certain delay period, so that the resistance 186 will be cut out of circuit with the armature windings 188 and the field windings 191 of the motors 37, so as to impress full voltage thereacross, the shorting circuit including a lead 202 connected in parallel with the resistance 186 and the closed contact 189.

The main relay winding 178 will continue to be energized by the holding contact 185 thereof until the start-stop switch 174 is opened, at which time all the circuits controlling the motors 37 are opened. The motors 37 will drive the inby or mobile unit 21 in a direction to place tension on the belt 23, which tension will place too great a load on the overload relay 184 causing its normally closed contact 182 to open, thereby opening the circuit to the motors 37 irrespective of the position of the start-stop switch 174. The overload relay 184 may be of the manual resetting type, so that once actuated, the motors 37 will not go through the starting cycle described until the overload relay 184 is first reset manually. The operation of the reverse drum 173 in order to effect reversing of the drive motors 37 is believed too well known to require description thereof. Suffice it to say, however, the reverse drum 173 carries contact bars which are effective to reverse the direction of the field current in the field windings 191 of the motor 37.

From the description thus far it is evident that the motors 37 may be driven in a direction to move the crawler treads 41 in the direction to advance the inby unit 21 towards the working face.

The shaker drive 25 supported on the mobile unit 21 is then started through a customary starting circuit, not shown, as is conventional with drives of this type. The shaking motion of the belt 23 may be considered as having two cycles. One of such cycles, see Fig. 4, consists of a motion of the conveyor belt at a slow speed in the direction of the outby unit 22 so that during said cycle material is carried upon the belt. The acceleration and velocity characteristics of the conveyor belt 23 during such conveying portion of the cycle is shown along portion A and A¹ of the velocity-time curve shown in Fig. 4. The abscissae of the velocity-time curve corresponds to the angular position of displacement of an eccentrically mounted standard driving pinion such as may be shown in Sloane Patent No. 2,585,971, issued February 19, 1952, for Improvements in Gearing, and need not be shown in detail in this application. The movement of the shaker belt 23 in a reverse direction toward the inby unit 21 has a velocity characteristic represented by the portion of the velocity curve B shown in Fig. 4. The velocity of the shaker belt during this portion of the cycle is such that the belt 23 will move at a speed so as to overcome the friction between the material conveyed by the belt 23 in a manner well known to those skilled in the art relating to shaker conveyors.

Since the belt 23 is not capable of taking compressive stresses, tension must be placed thereon during the load carrying stroke thereof represented by the portions A and A¹ of the velocity-time curve as shown in Fig. 4. As has been described, the hydraulic cylinder 82 is operable during such stroke to cause the piston rod 86 thereof to extend with respect to the cylinder 82 and place the proper amount of tension upon the belt 23. The control of the cylinder 82 is effected by the transmitting selsyn generator 139 and the receiving selsyn motor 132. Displacement of the transmitting selsyn generator 139 in accordance with the displacement of the belt 23 at the mobile unit 21 gives a similar displacement to the selsyn motor 132 at the outby unit 22 to operate the control valve 118 linked thereto.

The sequence of operations obtaining with the selsyn generator 139 to effect operation of the control valve 118 is best seen with reference to Figs. 5 and 6 which show the relationship of the control valve 118 controlled by the selsyns 139 and 132 to the fluid pressure system indicated generally by the reference numeral 100. The belt 23 as shown in Figs. 5 and 6 is shown as having a total amplitude of movement of the order of nine inches.

During the initial movement of the shaker belt 23 in a direction toward the outby unit 22, the valve plunger 122 is in a position to admit fluid to the cylinder 82 to advance the piston 92 in a direction toward the outby end of the unit 22 as seen in Fig. 2. This position of the spool valve member 122 is maintained for approximately six and one half inches of the stroke of the belt 23 in the load carrying or outby direction, at which time the land 126 thereof laps the port 119 and the pressure line 133 to the cylinder 92, such lapping movement taking place during approximately one half inch further movement of the belt 23.

During such movement the collar 96 strikes the head 99, and the movement of the piston 92 is such as to compress the spring 98. Since the belt 23 by this time has built up inertia tending to continue the movement thereof in the same direction the piston rod 86 continues to move therewith and with respect to the skirt 93 and the piston 92, such movement taking place for approximately one and one half inches of such further movement of the belt.

During the last one half inch of movement of the belt 23 in the outby or load carrying direction the spool valve member 122 moves in a direction to port the fluid from the cylinder 82 to tank, the pressure fluid being exhausted by the return line 138 and past the reduced portion 134 of the spool valve member 122 to the tank 107.

The spool valve member 122 continues in such position discharging the pressure fluid from the cylinder 82 to the tank 107 during the return movement of the belt 23 in the inby direction or in the direction toward the mobile unit 21. It will be apparent that the shaker drive unit in such return movement of the belt 23 will be maintaining tension thereon. At the completion of approximately six and one-half inches of return movement of the belt 23 the spool valve member 122 is moved in a direction to close the cylinder 82 from communication with the tank 107, the land 136 of the spool valve member 122 during such time lapping the port 137.

During this return movement, the piston rod 86 moves in the inby direction until the shoulder 97 thereof picks up the collar 96, the spring 98 assisting the urgence of the piston 92 in a direction toward the cylinder head 91 of the cylinder 82. During the last two inches of movement of the belt 23 in the inby direction the valve plunger 122 is arranged to close the port 119 and the line 117 and 133 to the cylinder 82, but during the last one-half inch of movement of the belt 23 in the inby direction the valve spool 122 continues to move until the reduced diameter portion thereof is in alignment with the port 119 and the pressure lines 117 and 133, so that tension will once more be placed upon the belt 23 by the piston 92 during the movement of the belt 23 in the outby direction, the sequence of operations just described being repeated during the reciprocating movement of the belt 23.

Means are provided for signaling from the outby unit 22 to the inby unit 21 of the necessity for movement of the inby unit 21 in a direction properly to tension the belt 23, as would be occasioned by an excess of load thereon and as would be occasioned by change in position of the outby unit 22 with respect to the mobile unit 21. Such signaling is occasioned by overtravel of the piston rod 86 in the outby direction upon such failure to maintain initial tension upon the belt 23 and is effective to move the mobile unit 21 in an inby direction irrespective of the condition of the start-stop switch 174.

To this end the bracket 88 connecting the piston rod 86 to the bottom plate 77 of the outby trough 76 is provided with a resilient bumper 206 backed by a spring 207, the bumper 206 and the spring 207 being retained within a recess 208 of the bracket 88 and held in position by a rod 209 held in position by a nut 211 threaded to the rod 209 and bearing against the bracket 88.

Referring now also to Fig. 7, the bumper 206 is adapted to contact a make-break switch 212 adapted to close a pair of contacts 213 and 214. The contacts 213 and 214 are part of circuit leads 216 and 217 which are connected back to the motor control circuit for the mobile unit 21 as seen more clearly in Fig. 7A.

The closing of the contacts 217 closes a circuit consisting of a lead 218 branching from the power lead 171, a control relay winding 219, the lead 217, contact points 213 and 214, the lead 216 and thence to the other side of the supply line 172 at a juncture point 221. The energization of the winding 219 closes a contact 222 and a contact 223. When contacts 222 and 223 are closed, the winding 179 of the time delay contactor will be energized, at the same time opening the contact 189 thereof and closing the contact 181 thereof. The closing of the contact 181 will energize the winding 178 of the main relay 178 and close the contact 183 thereof thus making voltage effective across the drive motors 37 through the starting resistance 186 connected in circuit therewith. It will be remembered that the contact 189 remains open during the energization of the winding 179 so that the motor 37 will be driven only at a reduced speed since the resistance 186 is connected in series therewith.

During this take-up movement of the belt 23 by the operation of the drive motors 37, the shaker unit 26 will continue to operate and when the proper tension is brought upon the belt 23 by operation of the motors 37, the piston rod 86 will not overtravel with respect to the cylinder 82 so that the bumper 206 will no longer close the contacts 213 and 214. The opening of said contacts will, of course, deenergize the winding of the relay 219, at the same time opening the contacts 222 and 223, deenergizing the winding 179 and opening the main contact 183 in circuit with the motors 37.

Such operation at low speed of the motors 37 in a direction to correct the belt tension will automatically take place as the necessity therefor arises, there being no attention required of the operator to correct the tension of the belt, such being had automatically.

When the working face is advanced the shaker drive is stopped, and the grip blocks of mobile unit 21 released. The mobile unit 21 may then be advanced towards the working face and the grip blocks operated to grip the belt 23 once more. The shaker drive 25 may then be restarted and the sequence of operations previously described, repeated, automatic correction of the tension of the belt being had as needed as previously described.

In the event of over-tensioning of the belt 23 as might be occasioned by too great a load therein, or by overtravel of the mobile unit 21 in an inby direction, the grip blocks 34 will release in the manner previously described to correct the tension.

The mobile unit 21 may be arranged to receive the discharge from a gathering and loading machine or from the discharge boom of a continuous miner, both not shown. Alternately, the mobile unit 21 may provide a means of supplying power to a duckbill type of gathering head, the reciprocating motion therefor being provided by the reciprocating movement of the trough 32 and a suitable connection to the rock arm 27 of the shaker drive 25.

From the foregoing description of the invention it will be apparent that there has been provided a new and useful improvement in apparatus for conveying material from the working face of a coal mine or the like. While the invention has been described in terms of a preferred embodiment thereof, it is not intended that the invention be limited by the precise embodiment herein shown, nor otherwise than by the scope and terms of the claims here appended.

I claim as my invention:

1. A shaker conveyor comprising an inby unit and an outby unit supporting a material conveying belt having reciprocating motion, a shaker drive mounted on one of said units for imparting reciprocating motion to said belt, fluid pressure means mounted on the other of said units and operable only upon the movement of said belt in a direction tending to buckle same for placing tension on said belt to prevent buckling thereof, and means actuated by the reciprocation of said belt for controlling said fluid pressure means.

2. A shaker conveyor comprising an inby unit and an outby unit supporting a material conveying belt having reciprocating motion, a shaker drive mounted on one of said units for imparting reciprocating motion to said belt, fluid pressure means mounted on the other of said units and operable only upon the movement of said belt in a direction tending to buckle same for placing tension on said belt to prevent buckling thereof, means responsive to the displacement and direction of movement of the belt at the said one unit, and means responsive to said last mentioned means for controlling said fluid pressure means.

3. The invention as defined in claim 2 wherein the means for controlling said fluid pressure means includes a control valve.

4. A shaker conveyor comprising a stationary unit and a mobile unit for supporting a material conveying belt having reciprocating motion, a shaker drive mounted on one of said units for imparting reciprocating movement to said belt, a motor for driving said mobile unit, fluid pressure means mounted on the other of said units and operable only upon the movement of said belt in a direction to buckle same for placing tension on said belt to prevent buckling thereof, and means operable upon the overtravel of said belt at said other unit arising from the slack of said belt and the placing under tension thereof by said fluid pressure means for controlling said motor to drive said mobile unit in a direction to take up the slack on said belt.

5. A shaker conveyor comprising a stationary unit and a mobile unit for supporting a material conveying belt having reciprocating motion, a shaker drive mounted on one of said units for imparting reciprocating movement to said belt, a motor including a control circuit therefor for driving said mobile unit, fluid pressure means mounted on the other of said units and operable only upon the movement of said belt in a direction tending to buckle same for placing tension on said belt to prevent buckling thereof, and switch means operable upon the overtravel of said belt at said other unit arising from the slack of said belt and the placing under tension thereof by said fluid pressure means, said switch means being connected in said control circuit for said motor to drive said mobile unit in a direction to take up the slack on said belt.

6. A shaker conveyor comprising a stationary unit and a mobile unit for supporting a material conveying belt having reciprocating motion, a shaker drive mounted on one of said units for imparting reciprocating movement to said belt, a stationary support mounted on said unit for storing additional lengths of said belt, and means movable with said belt and with said shaker drive for gripping said belt to cause said belt to reciprocate whilst the additional supply of said belt is held on said stationary support.

7. A shaker conveyor comprising a stationary unit and a mobile unit for supporting a material conveying belt having reciprocating motion, a shaker drive mounted on one of said units for imparting reciprocating movement to said belt, a stationary support mounted on said unit for storing additional lengths of said belt, and means movable with said belt and with said shaker drive for gripping said belt to cause said belt to reciprocate whilst the additional supply of said belt is held on said stationary support, said last named means being automatically releasable upon over-tension of said belt until the tension thereof is lowered to a desired value.

8. A shaker conveyor comprising a stationary unit and a mobile unit for supporting a material conveying belt having reciprocating motion, a shaker drive mounted on one of said units for imparting reciprocating movement to said belt, a stationary support mounted on said unit for storing additional lengths of said belt, and means movable with said belt and with said shaker drive for gripping said belt to cause said belt to reciprocate whilst the additional supply of said belt is held on said stationary support, said gripping means being releasable so that an additional length of said belt may be supplied when said mobile unit is moved away from said stationary unit.

9. A shaker conveyor comprising an inby unit and an outby unit supporting a material conveying belt having reciprocating motion, a shaker drive mounted on one of said units for imparting reciprocating motion to said belt, means mounted on the other of said units and operable only upon the movement of said belt in a direction tending to buckle same for placing tension on said belt to prevent buckling thereof, and means actuated by the reciprocation of said belt for controlling said first mentioned means.

10. A shaker conveyor comprising an inby unit and an outby unit supporting a material conveying belt having reciprocating motion, a shaker drive mounted on one of said units for imparting reciprocating motion to said belt, means mounted on the other of said units and operable only upon the movement of said belt in a direction tending to buckle same for placing tension on said belt to prevent buckling thereof, means responsive to the displacement and direction of movement of the belt at the said one unit, and means responsive to said last mentioned means for controlling said first mentioned means.

11. A shaker conveyor comprising a stationary unit and a mobile unit for supporting a material conveying belt having reciprocating motion, a shaker drive mounted on one of said units for imparting reciprocating movement to said belt, a motor for driving said mobile unit, means mounted on the other of said units and operable only upon the movement of said belt in a direction to buckle same for placing tension on said belt to prevent buckling thereof, and means operable upon the overtravel of said belt at said other unit arising from the slack of said belt and the placing under tension thereof by said first mentioned means for controlling said motor to drive said mobile unit in a direction to take up the slack on said belt.

12. A shaker conveyor comprising a stationary unit and a mobile unit for supporting a material conveying belt having reciprocating motion, a shaker drive mounted on one of said units for imparting reciprocating movement to said belt, a motor including a control circuit therefor for driving said mobile unit, means mounted on the other of said units and operable only upon the movement of said belt in a direction tending to buckle same for placing tension on said belt to prevent buckling thereof, and switch means operable upon the overtravel of said belt at said other unit arising from the slack of said belt and the placing under tension thereof by said first mentioned means, said switch means being connected in said control circuit for said motor to drive said mobile unit in a direction to take up the slack on said belt.

13. A shaker conveyor comprising an inby unit and an outby unit supporting a material conveying belt having reciprocating movement, a shaker drive mounted on one of said units for imparting reciprocating motion to said belt, said shaker drive placing tension on said belt in one direction only of movement thereof, and means mounted on the other of said units for placing tension on said belt only during the opposite direction of movement thereof in amount sufficient to prevent buckling thereof.

14. A shaker conveyor comprising an inby unit and an outby unit supporting a material conveying belt having reciprocating movement, a shaker drive mounted on one of said units for imparting reciprocating motion to said belt, said shaker drive placing tension on said belt in one direction only of movement thereof, and means mounted on the other of said units and acting independently of said shaker drive for placing tension of said belt only during the opposite direction of movement thereof, the tension being in amount sufficient to prevent buckling thereof.

15. A shaker conveyor comprising an inby unit and an outby unit supporting a material conveying belt having reciprocating movement, a shaker drive mounted on one of said units for imparting reciprocating motion to said belt, said shaker drive placing tension on said belt in one direction only of movement thereof, and fluid pressure means mounted on the other of said units for placing tension of said belt only during the opposite direction of movement thereof, said tension being in amount sufficient of prevent buckling of said belt.

References Cited in the file of this patent

FOREIGN PATENTS

| | | |
|---|---|---|
| 338,023 | Germany | June 11, 1921 |
| 492,525 | Great Britain | Sept. 19, 1938 |
| 622,674 | Great Britain | May 5, 1949 |